United States Patent Office 3,298,997
Patented Jan. 17, 1967

3,298,997
PROCESS FOR MAKING OIL AND SOLVENT RESISTANT FLUOROSILICON RESINS
George W. Holbrook, Midland, Mich., assignor to Dow Corning Company, Midland, Mich., a corporation of Michigan
No Drawing. Filed Oct. 22, 1965, Ser. No. 502,314
12 Claims. (Cl. 260—46.5)

This invention relates to a process for making silicone resins. The invention also relates to alkoxylated siloxanes produced by the above process. This invention pertains to a novel fluorocarbon silicone resin that exhibits oil and solvent resistant characteristics which have not been available heretofore.

It is an object of this invention to prepare resinous materials which possess improved physical properties. It has been found that fluorosilicone resins can be prepared by partial hydrolysis of the proper mixture of alkoxy silanes, followed by a condensation between silanol and alkoxy radicals. Accordingly, it is an object of this invention to provide a novel fluorocarbon silicone resin. The fluorosilicone resins of this invention are of great commercial importance due to the oil and solvent resistant characteristics imparted. Because of these features, the resins of this invention will be commercially available and useful for wire enamels, paint resins, and molding compounds for resistor coatings.

These and other related objects will be apparent from the following detailed description of the invention.

This invention relates to a process for making silicone resins, which process comprises, (1) Admixing partial hydrolyzates of
(a) from 0 to 60 mole percent of silanes of the general formula $RSiX_3$, where R is a perfluoroalkylethyl radicals and X is an alkoxy radical of less than 7 carbon atoms,
(b) from 40 to 60 mole percent of silanes of the general formula $RR'SiX_2$, wherein R and X are as above defined and R' is a nonvalent hydrocarbon radical free of aliphatic unsaturation,
(c) from 0 to 60 mole percent of organosilanes of the general formula $YSi(X)_3$, wherein Y is any aryl, alkaryl, or aralkyl radical and X is as above defined, at least 25% of the total silicon atoms present in the mixture having aryl, alkaryl or aralkyl substituents bonded thereto, and (2) Further condensing said partial hydrolyzates in the presence of a fluoroalkane sulphonic acid.

In the compounds above, R can be any perfluoroalkylethyl radical of the formula $C_xF_{2x+1}CH_2CH_2$— where $x$ is an integer of from 1 to 10. The perfluoroalkylethyl radical of said R group preferably has from 1 to 10 carbon atoms, such as, 3,3,3-trifluoropropyl, 3,3,4,4,5,5,5-heptafluoropentyl, $C_{10}F_{21}C_2H_4$—, $(CF_3)_2CFCH_2CH_2$—, $CF_3CF_2CF(CF_3)CH_2CH_2$—, and $C_2F_5CH_2CH_2$—. While any perfluoroalkylethyl radical can function effectively in this invention, the preferred radical is 3,3,3-trifluoropropyl due to its commercial availability.

R' can be any monvalent hydrocarbon radical free of aliphatic unsaturation such as methyl, ethyl, propyl, butyl, pentyl, phenyl, cyclopentyl, cyclohexyl, dodecyl, octadecyl, and mericyl radicals among others.

X can be any of the lower alkoxy radicals including methoxy, ethoxy, propoxy, and isopropoxy among others.

Examples of the silanes that can function effectively in the above process are, 3,3,3-trifluoropropyltrimethoxy silane, $C_{10}F_{21}C_2H_4Si(CH_3)(OC_2H_5)_2$,

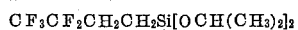

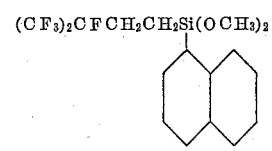
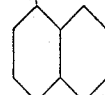

and 3,3,3-trifluoropropylcyclopentyldimethoxy silane.

Y can be any aryl radical such as phenyl, xenyl, naphthyl, and any alkaryl radical such as tolyl, and any aralkyl radical such as benzyl and 2-phenylpropyl.

It is to be noted that the admixture of partial hydrolyzates in this invention may comprise either (a), (b), and (c) or (a) and (b). It is imperative that at least 25 percent of the total silicon atoms present in the mixture have the necessary aryl, alkaryl, or aralkyl substituents bonded thereto. Therefore, if (b) contains the necessary amount of aryl, alkaryl or aralkyl substituents, (c) is not required. If (b) does not contain the necessary substituents, at least 25 mole percent (c) is required for the success of this invention.

By the term "partial hydrolyzates" in the above is meant the product of a hydrolysis under specific conditions wherein a portion of alkoxy radicals are retained prior to condensation. It has been found, that for a proper cure both hydroxy and alkoxy radicals bonded to the silicon atom (i.e. HOSi≡ and XSi≡) must be present. Retention of the alkoxy radicals of the starting materials can be achieved in a predetermined manner by controlling the amount of water used for hydrolysis. Where more than 80 percent water necessary for complete hydrolysis is used, an insufficient amount of alkoxy radicals are retained and the cured product is bubbled and of an inferior quality.

The partial hydrolyzates of the present invention can be prepared by alternative methods. The trifunctional silane (a), the difunctional silane (b), and the phenylsilane (c) can be admixed together and partially hydrolyzed to recover the desired partial hydrolyzate. Alternatively, each individual silane can be partially hydrolyzed alone and subsequently admixed or the trifunctional silane (a) and difunctional silane (b) can be admixed and partially hydrolyzed followed by a partial hydrolysis of the phenylsilane, the partial hydrolyzates of each then being admixed to obtain the desired partial hydrolyzate of this invention. If (b) contains the required aryl, alkaryl, or aralkyl substituents necessary and (c) is not required, then (a) and (b) can be admixed and partially hydrolyzed to recover the desired partial hydrolyzate or (a) and (b) can be partially hydrolyzed individually and subsequently admixed to obtain the desired partial hydrolyzate of this invention. The partial hydrolyzate of the above methods is then further condensed in the presence of a fluoroalkane sulphonic acid.

This invention also relates to a siloxane copolymer consisting essentially of (a) from 0 to 60 mole percent of units of the formula $RSiO_{3/2}$, wherein R is as defined above,
(b) from 40 to 60 mole percent of units of the formula RR'SiO, wherein R and R' are as defined above, and (c) from 0 to 60 mole percent of units of the formula $YSiO_{3/2}$, wherein Y is as defined above, at least 25% of the total silicon atoms present in the mixture having aryl, alkaryl or aralkyl substituents bonded thereto It has been found that units of the formula $YSiO_{3/2}$ wherein Y is an aryl, alkaryl or aralkyl radical is necessary for the success of this invention.

The inclusion of the necessary aryl, alkaryl, or aralkyl substituents is for the benefit of an adequate cure and is to effectuate the catalyst. Absent these substituents the catalyst is insoluble and resins containing less than 25 mole percent of said substituents will not cure satisfactorily. Although any amount of said substituents in excess of 25 mole percent can function effectively, the preferred range is from 25 to 60 mole percent.

The partial hydrolyzates of trifunctional silanes (a), difunctional silanes (b), and organosilanes (c) or (a) and (b) described above are admixed, order of addition being unimportant, stirred, and heated to a preferred temperature of at least 60° C., although no heating is required. Water is then added in a range of from 50 to 80 percent necessary for complete hydrolysis to effect "partial hydrolysis," with the evolution of alcohol. Following "partial hydrolysis," the formulation is catalyzed with a fluoroalkane sulphonic acid such as $HCF_2CF_2SO_3H$ and oven-cured at a temperature in the preferred range of from 140° C. to 160° C., although curing may be accomplished in a temperature range of from 60° C. to 200° C.

To effect condensation, the sulphonic acids which are operative in the instant invention within the catalytic range of from trace amounts to 5.0 percent catalyst by weight, although the preferred catalytic range is from .01 to 1.0 percent by weight containing fluorinated radicals that can be perfluoroalkyl radicals of from 1 to 12 inclusive carbon atoms (i.e. $C_pF_{2p+1}$ where $p=1-12$), or alkyl radicals of from 1 to 4 carbon atoms in which all but one of the hydrogen atoms are replaced by fluorine atoms (i.e. $C_{p'}F_{2p'}\cdot H$ where $p'=1-4$). From the known methods of preparation, the remaining hydrogen atom in the latter type of radical can only be on the carbon atoms which are alpha or beta to the sulphur. These materials are prepared by reacting sodium bisulphite in water with the appropriate perfluoroalkene under pressure whereby the bisulphite adds across the double bond. The specific conditions for the preparation of $HCF_2CF_2SO_3H$ are disclosed in "Addition Reactions of Tetrafluoroethylene" by D. D. Coffman, M. S. Raasch, G. W. Rigby, P. R. Barrick, and W. E. Hanford in Journal of Organic Chemistry, 1949, 14, pages 747 to 753. The use of such catalysts is also disclosed in U.S. Patent No. 2,961,425, November 22, 1960. The conventional resin catalysts such as amines and carboxylic acid salts of metals such as lead, tin, and iron either fail to work or result in heterogeneous, badly bubbled products.

The following examples are intended to aid those skilled in the art in understanding and practicing this invention. The examples do not delineate the scope of the invention. All parts and percentages set forth in the examples are based on weight unless otherwise specified.

EXAMPLE 1

A mixture of 40 mole percent of $C_6H_5Si(OCH_3)_3$, 20 mole percent of $CF_3CH_2CH_2Si(OC_2H_5)_3$, and 40 mole percent of

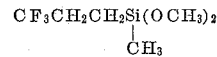

was stirred and heated to 90° C. Water was added in the increments shown below. As soon as the initial, rapid evolution of alcohol subsided, a 0.5 ml. sample was removed, catalyzed with 1.0 drop of $HCF_2CF_2SO_3H$ and placed in an oven at 150° C. The films were removed from the oven and the following results were obtained.

| Sample | H₂O g. | H₂O Mole | Cumulative Percent theory necessary for complete hydrolysis | Results |
|---|---|---|---|---|
| 1 | 5.85 | 0.35 | 50 | Smooth, Bubble-Free, hard. |
| 2 | 1.17 | 0.065 | 60 | Do. |
| 3 | 1.17 | 0.065 | 70 | Do. |
| 4 | 1.17 | 0.065 | 80 | Increasing bubbling and decreasing cure rate. The samples are soft at room temperature and very tacky at 150° C. |
| 5 | 1.17 | 0.065 | 90 | |
| 6 | 1.17 | 0.065 | 100 | |
| 7 | 1.17 | 0.065 | 110 | |
| 8 | 1.17 | 0.065 | 120 | |
| 9 | 9.36 | 0.520 | 200 | Did not cure. |

The hydrolyzate after addition (9) had an OH content of 2.99 percent and an alkoxy content of 1.0 percent.

EXAMPLE 2

A mixture of 60 mole percent $CF_3CH_2CH_2Si(OCH_3)_3$ and 40 mole percent

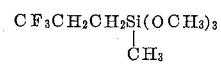

was hydrolyzed with water [5.8 g., 0.325 mole (50 percent of theory)]. After partial hydrolysis the mixture was stripped to 90° C. to remove unreacted methanol. The sample was removed and catalyzed with 1.0 drop of $HCF_2CF_2SO_3H$ and placed in an oven at 150° C. The cured film was smooth, bubble-free, and hard.

EXAMPLE 3

A mixture of 40 mole percent of $C_6H_5Si(OCH_3)_3$, 20 mole percent of $CF_3CH_2CH_2Si(OCH_3)_3$, and 40 mole percent of

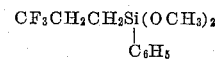

was hydrolyzed with water [5.85 g., 0.35 mole (50 percent of theory)] in methanol (5.85 g.). Following the hydrolysis an additional 8.3 g. of methanol was added. The mixture was stirred and refluxed for 2 hours and filtered.

The alkoxylated siloxane had the following composition:

Percent $OCH_3$ _____ 19.9
Percent OH _____ 0.24
Percent F _____ 18.9

(A) A one gram sample was catalyzed with one drop of $HCF_2CF_2SO_3H$ and placed in an oven at 150° C. The sample cured in one hour to give a smooth bubble-free solid.

(B) A two gram sample was placed in a watch glass, catalyzed with two drops of $HCF_2CF_2SO_3H$ and cured at 150° C. Because of the concavity of the watch glass the sample was vary thin at the edges and much thicker at the center. The edges of the sample cured rapidly giving a smooth, bubble-free surface. The thicker center section cured slowly to give a bubbled surface.

(C) A five gram sample was catalyzed with two drops of $HCF_2CF_2SO_3H$ and heated for 3 hours at 125° C., followed by 17 hours at 170° C., in a flask fitted with a distillation head, condenser, receiver, and cold trap. The system was fitted with a drying tube to exclude water vapor. There was no reaction. H₂O (0.15 g., 50 percent theory) was added. Methanol was evolved and the mixture cured rapidly.

(D) A sample of Example 1(9) (2.99 percent OH, 0.57 g., 0.001 mole OH) was mixed with a sample of Example 3 (19.9 percent OCH₃, 0.16 g., 0.001 mole OCH₃), catalyzed with one drop of HCF₂CF₂SO₃H and heated at 150° C. The sample cured in 20 minutes.

EXAMPLE 4

Duplicate samples of the cured resin of Example 3 having the composition of 40 mole percent C₆H₅O₃/₂, 20 mole percent CF₃CH₂CH₂SiO₃/₂, and 40 mole percent of (CF₃CH₂CH₂SiO)ₓ
|
CH₃ were heated in aluminum cups in an air circulating oven. Weight loss was determined at the intervals shown and are expressed as cumulative percent:

| Time-Hours | Percent Weight Loss | | | 250° C., Average |
|---|---|---|---|---|
| | 1 | 2 | 3 | |
| 1 | 1.1 | 1.1 | 1.0 | 1.1 |
| 2 | 1.4 | 1.0 | 1.3 | 1.2 |
| 3 | 1.6 | 1.6 | 1.5 | 1.6 |
| 19 | 2.7 | 3.0 | 2.5 | 2.7 |
| 24 | 2.8 | 3.0 | 3.0 | 2.9 |

The samples showed no signs of embrittlement or loss of strength.

EXAMPLE 5

The following is a summary of representative formulations of the phenylsiloxanes and alkoxylated siloxanes which were then cured. The table lists the determinations that were made:

| Sample | Mol Percent | | |
|---|---|---|---|
| | C₆H₅O₃/₂ | CF₃CH₂CH₂SiO₃/₂ | CF₃CH₂CH₂SiO<br>\|<br>CH₃ |
| 1 | 40 | | 60 |
| 2 | 52.7 | | 47.3 |
| 3 | 52.7 | 15.8 | 31.5 |
| 4 | 25 | 25 | 50 |
| 5 | 30 | 30 | 40 |
| 6 | 40 | 20 | 40 |
| 7* | | 60 | 40 |
| 8 | 25 | 35 | 40 |
| 9* | 0 | 60 | 40 |
| 10* | 20 | 40 | 40 |

*For comparative purposes. These samples indicate the necessity of having at least 25 mole percent phenylsiloxane.

The film in sample (8) cured, but was very soft. Samples (7), (9) and (10) failed to cure.

EXAMPLE 6

When the following compounds are substituted for the corresponding catalyst in Example 3, equivalent results are obtained.
(a) CF₃SO₃H
(b) C₂F₅SO₃H
(c) C₄F₉SO₃H
(d) C₁₈F₁₇SO₃H
(e) HCF₂SO₃H
(f) CF₃CFHCF₂SO₃H

EXAMPLE 7

When the following compounds are substituted for the corresponding compounds in Example 1, equivalent results are obtained.

(A) Substituted for C₆H₅Si(OCH₃)₃

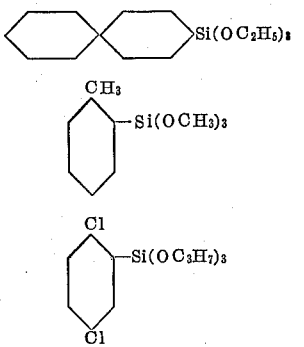

(B) Substituted for CF₃CH₂CH₂Si(OCH₃)₃
(1) C₄F₉CH₂CH₂Si(OC₂H₅)₃
(2) C₈F₁₇CH₂CH₂Si(OCH₃)₃
(3) C₁₀F₂₁CH₂CH₂Si(OC₃H₇)₃
(4) C₂H₅CH₂CH₂Si(OCH₃)₃

(C) Substituted for

CF₃CH₂CH₂Si(OCH₃)₂
|
CH₃

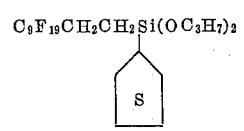

That which is claimed is:
1. A process for making silicone resins which process comprises,
(1) admixing partial hydrolyzates with no more than 80 percent water necessary for complete hydrolysis, said partial hydrolyzates being prepared of
(a) from 0 to 60 mole percent of silanes of the general formula RSiX₃, wherein R is a perfluoroalkylethyl radical and X is an alkoxy radical of less than 7 carbon atoms,
(b) from 40 to 60 mole percent of silanes of the general formula RR'SiX₂, wherein R and X are as defined above and R' is a monovalent hydrocarbon radical free of aliphatic unsaturation,
(c) from 0 to 60 mole percent of organosilanes of the general formula YSi(X)₃, wherein X is as defined above and Y is a member selected from the group consisting of aryl, alkaryl, and aralkyl radical, at least 25% of the total silicon atoms present in the mixture having aryl, alkaryl, or aralkyl substituents bonded thereto, there being a total of 100 mol percent of (a), (b), and (c), and
(2) further condensing in a temperature range of from 60° to 200° C. said partial hydrolyzates in the presence of a fluoroalkane sulphonic acid.

2. The process of claim 1 wherein the fluoroalkane sulphonic acid catalyst is HCF₂CF₂SO₃H.

3. The process of claim 1 wherein the mole percent of (c) is within a range of from 35 to 40 mole percent, the mole percent of (a) is within a range of from 20 to 30 mole percent, and the mole percent of (b) is within a range of from 35 to 40 mole percent.

4. The process of claim 1 wherein the mole percent of (a) is 40 to 60 percent, the mole percent of (b) is 40 to 60 percent, and the mole percent of (c) is 0.

5. The process of claim 1 further characterized in that the fluoroalkane sulphonic acid is selected from acids of the group consisting of the formulae $C_pF_{2p+1}SO_3H$ where $p$ is 1–12 and $C_{p'}F_{2p'}HSO_3H$ where $p'$ is 1–4 and the hydrogen atoms in the fluoroalkane substituent are alpha or beta to the sulfur atom.

6. A process for making silicone resins which process comprises,
   (1) admixing
       (a) from 0 to 60 mole percent of silanes of the general formula $RSiX_3$, wherein R is a perfluoroalkylethyl radical and X is an alkoxy radical of less than 7 carbon atoms,
       (b) from 40 to 60 mole percent of silanes of the general formula $RR'SiX_2$, wherein R and X are as defined above and R' is a monovalent hydrocarbon radical free of aliphatic unsaturation, and
       (c) from 0 to 60 mole percent of organosilanes of the general formula $YSi(X)_3$, wherein X is as defined above, and Y is a member selected from the group consisting of aryl, alkaryl, and aralkyl radical, at least 25% of the total silicon atoms present in the mixture having aryl, alkaryl, or aralkyl substituents bonded thereto, there being a total of 100 mol percent of (a), (b), and (c), and
   (2) partially hydrolyzing the above mixture by admixing with water, the percentage of water used for the partial hydrolysis is within a range of from 50 percent to 80 percent of theory necessary for complete hydrolysis and,
   (3) further condensing in a temperature range of from 60° to 200° C. said partially hydrolyzed mixture in the presence of a fluoroalkane sulphonic acid.

7. A siloxane copolymer consisting essentially of
   (a) from 0 to 60 mole percent of units of the formula $RSiO_{3/2}$, wherein R is a perfluoroalkylethyl radical,
   (b) from 40 to 60 mole percent of units of the formula $RR'SiO$, wherein R is as defined above and R' is a monovalent hydrocarbon free of aliphatic unsaturation,
   (c) from 0 to 60 mole percent of units of the formula $YSiO_{3/2}$, wherein Y is a member selected from the group consisting of aryl, alkaryl, and aralkyl radical, at least 25% of the total silicon atoms present in the mixture having aryl, alkaryl, or aralkyl substituents bonded thereto, there being a total of 100 mol percent of (a), (b), and (c).

8. The composition of claim 7 wherein R is a 3,3,3-trifluoropropyl radical.

9. The composition of claim 7 wherein R' is a methyl radical.

10. The composition of claim 7 wherein the mole percent of (c) is within a range of from 35 to 40 mole percent, the mole percent of (a) is within a range of from 20 to 30 mole percent, and the mole percent of (b) is within a range of from 35 to 40 mole percent.

11. The composition of claim 7 wherein the mole percent of (a) is within a range of from 40 to 60 mole percent, the mole percent of (b) is within a range of from 40 to 60 mole percent, and the mole percent of (c) is 0.

12. The composition of claim 7 wherein (a) is 60 mole percent $CF_3CH_2CH_2SiO_{3/2}$ and (b) is 40 percent $$CF_3CH_2CH_2SiO \atop | \atop C_6H_5$$

References Cited by the Examiner

UNITED STATES PATENTS

| | | | |
|---|---|---|---|
| 2,832,794 | 4/1958 | Gordon | 260—46.5 |
| 2,961,425 | 11/1960 | Pierce et al. | 260—448.2 |
| 3,006,878 | 10/1961 | Talcott | 260—448.2 |
| 3,122,521 | 2/1964 | Pierce | 260—448.2 |
| 3,148,201 | 9/1964 | Fassnacht | 260—448.2 |

OTHER REFERENCES

Rochow, "Chemistry of the Silicones," Wiley and Sons, Inc., N.Y., 1951, pages 68 to 69.

DONALD E. CZAJA, *Primary Examiner.*

M. I. MARQUIS, *Assistant Examiner.*

U.S. PATENT OFFICE
UNITED STATES PATENT OFFICE
CERTIFICATE OF CORRECTION

Patent No. 3,298,997　　　　　　　　Dated: January 17, 1967

George W. Holbrook

It is certified that errors appear in the above-identified paten and that said Letters Patent are hereby corrected as shown below:

Col. 1, line 35, the word "radicals" should read --radical--.

Col. 4, line 35, the formula $\underset{\overset{|}{CH_3}}{CF_3CH_2CH_2Si(OCH_3)_3}$ should read $\underset{\overset{|}{C_6H_5}}{CF_3CH_2CH_2Si(OCH_3)_2}$ ;　line 48, the formula $\underset{\overset{|}{C_6H_5}}{CF_3CH_2CH_2Si(OCH_3)_2}$ should read $\underset{\overset{|}{CH_3}}{CF_3CH_2CH_2Si(OCH_3)_2}$ .

SIGNED AND
SEALED
FEB 3 1970

(SEAL)
Attest:

Edward M. Fletcher, Jr.
Attesting Officer

WILLIAM E. SCHUYLER, JR.
Commissioner of Patents